United States Patent [19]

Martin

[11] Patent Number: 5,297,820
[45] Date of Patent: Mar. 29, 1994

[54] LINE COUPLING SYSTEM

[75] Inventor: Karl-Heinz Martin, Grafrath, Fed. Rep. of Germany

[73] Assignee: Kreuzer GmbH & Co. oHG, Puchheim, Fed. Rep. of Germany

[21] Appl. No.: 959,139

[22] Filed: Oct. 9, 1992

[30] Foreign Application Priority Data

Nov. 19, 1991 [DE] Fed. Rep. of Germany ....... 4138064

[51] Int. Cl.[5] .............................. F16L 39/00
[52] U.S. Cl. .................. 285/137.1; 285/176; 285/351; 403/4; 403/391
[58] Field of Search ...................... 285/137.1, 176, 12, 285/26, 29, 252, 351; 403/3, 4, 389, 391

[56] References Cited

U.S. PATENT DOCUMENTS

| | | |
|---|---|---|
| 3,282,612 | 11/1966 | Younger . |
| 4,186,946 | 2/1980 | Snow . |
| 4,319,772 | 3/1982 | Weirich et al. ................. 285/137.1 |
| 4,475,748 | 10/1984 | Ekman ............................... 285/351 |
| 4,544,185 | 10/1985 | Weirich et al. ................. 285/137.1 |
| 4,630,847 | 12/1986 | Blenkush .............................. 285/29 |
| 5,160,177 | 11/1992 | Washizu .............................. 285/351 |
| 5,209,440 | 5/1993 | Walker ........................ 285/137.1 X |

FOREIGN PATENT DOCUMENTS

| | | |
|---|---|---|
| 482972 | 12/1969 | Fed. Rep. of Germany . |
| 3443052C2 | 9/1989 | Fed. Rep. of Germany . |
| 657043 | 5/1929 | France . |
| 2177769 | 1/1987 | United Kingdom ............... 285/252 |

Primary Examiner—Randolph A. Reese
Assistant Examiner—Heather Chun
Attorney, Agent, or Firm—Donald Brown

[57] ABSTRACT

In a line connector system an incorrect interconnection of different lines shall be excluded. This is achieved by connecting a female connector (1-3, 1-6) to one line and a male plug (2-3, 2-6) to the other line, the female connector and male plug having a defined total length when connected; the total length may for example exactly correspond to the distance between two holding members (4, 5) of a holder (3) which receives the connected coupling members with the lines connected thereto. The individual female connectors and male plugs, respectively, have a respective different length such that the total length of incorrect coupling members in a connected state deviate from the predetermined length, whereby for example an insertion of the connected coupling members into the holder is impossible.

14 Claims, 3 Drawing Sheets

LINE COUPLING SYSTEM

BACKGROUND OF THE INVENTION

The invention relates to a line coupling system and in particular to a line coupling system for connection of a plurality of first lines to a plurality of second lines through respective first and second coupling members.

It is common in various technical fields to provide coupling members or lines with a code mark allowing an association of matching lines if those lines shall be unmistakeably interconnected. In this manner, electrical lines or signal lines in domestic installations or in the assembly or electrotechnical or electronic appliances may be provided with a color identification. Further, lines for gaseous or liquid media are usually provided with a color identification. However, an erroneous connection of such lines cannot be prevented in this manner.

In such cases where an erroneous connection must absolutely be excluded, as for example in certain connections of media which tend to explosion or combustion or which are provided for the care of patients also coded coupling members are used.

Conventionally, plug connections consisting of so-called female connectors and male plugs are used where the male plug has a defined geometrical shape (circle, triangle, rectangle, etc.) at a front part engaging the female connector and the geometrical shape corresponds to a respective shape of the inner surface at the matching female connector such that only an engagement of female connectors and male plugs having the corresponding shape is enabled.

Further, connector-nipple-systems are known wherein a cam is provided within the coupling at a defined angular position and a groove is provided in the front part of the matching plug at the same angular position; the angular position is different for each pair of coupling members such that not-matching plugs do not fit into the coupling. These plug-coupling-systems are difficult to manufacture and, therefore, costly.

OBJECTS OF THE INVENTION

It is an object of the invention to provide an improved line coupling system. It is a further object of the invention to provide a line coupling system in which the drawbacks of the aforementioned known systems are avoided. It is a still further object of the invention to provide a line coupling system which can positively prevent a connection of not-matching lines. It is a still further object of the invention to provide a line coupling system which can be variably used. It is a still further object of the invention to provide a line coupling system which can be manufactured in an easy and cheap manner.

SUMMARY OF THE INVENTION

According to the invention, a line coupling system comprises a plurality of first coupling members for connection with respective first lines and a plurality of second coupling members for connection with respective second lines, said first coupling members and said second coupling members having a match code in the form of an individual length which differs from the lengths of the other first and second coupling members, respectively, and which is selected such that the sum of the lengths of matching or corresponding first and second coupling members has a predetermined constant value whereas the sum of the lengths of unmatching first and second coupling members deviates from said constant value.

BRIEF DESCRIPTION OF THE DRAWINGS

Further advantages, features and objects of the invention will stand out from the following description of an examplary embodiment with reference to the drawings. In the drawings

DESCRIPTION OF A PREFERRED EMBODIMENT

Figure 1:
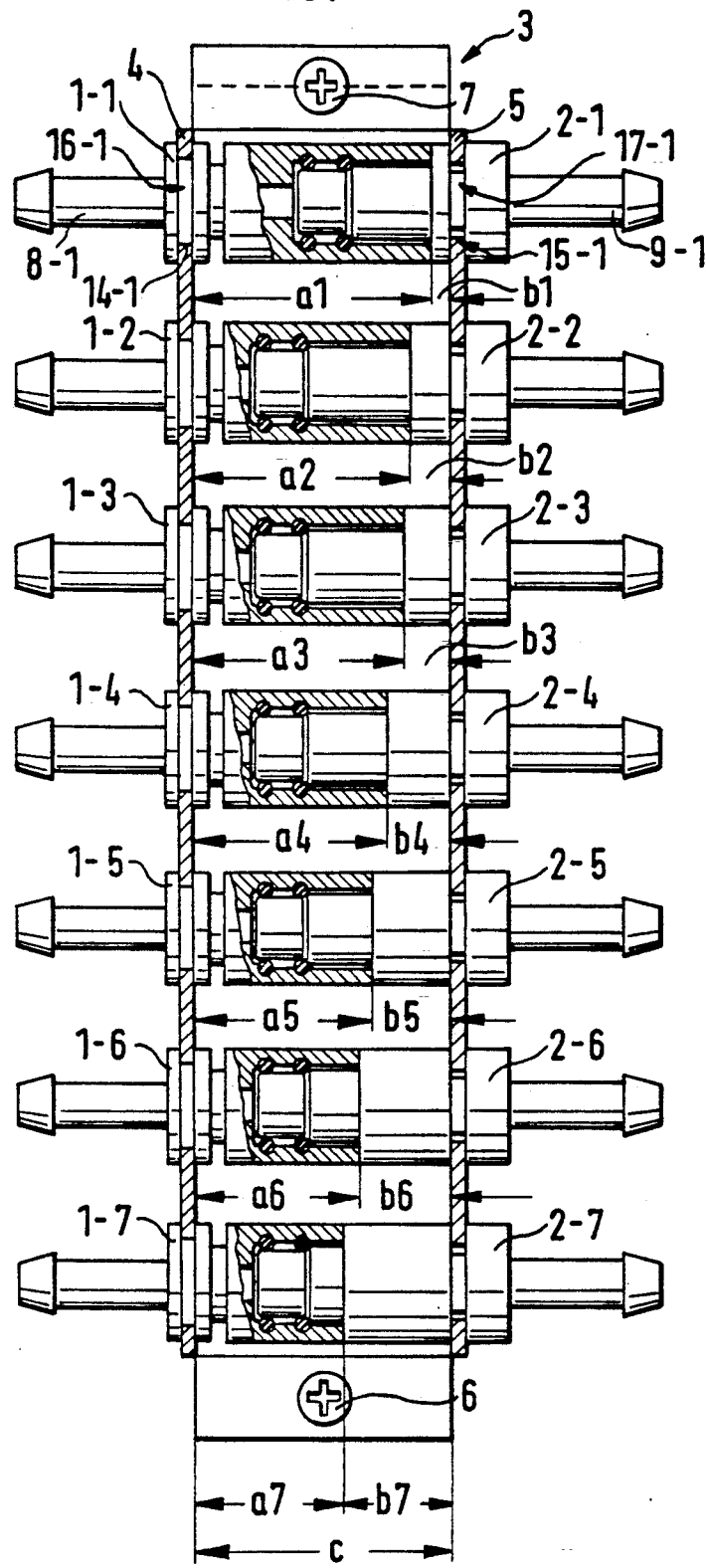
FIG. 1 is a sectional view of an embodiment of the invention with seven pairs of connected coupling members which are inserted into a holder.
Figure 2:
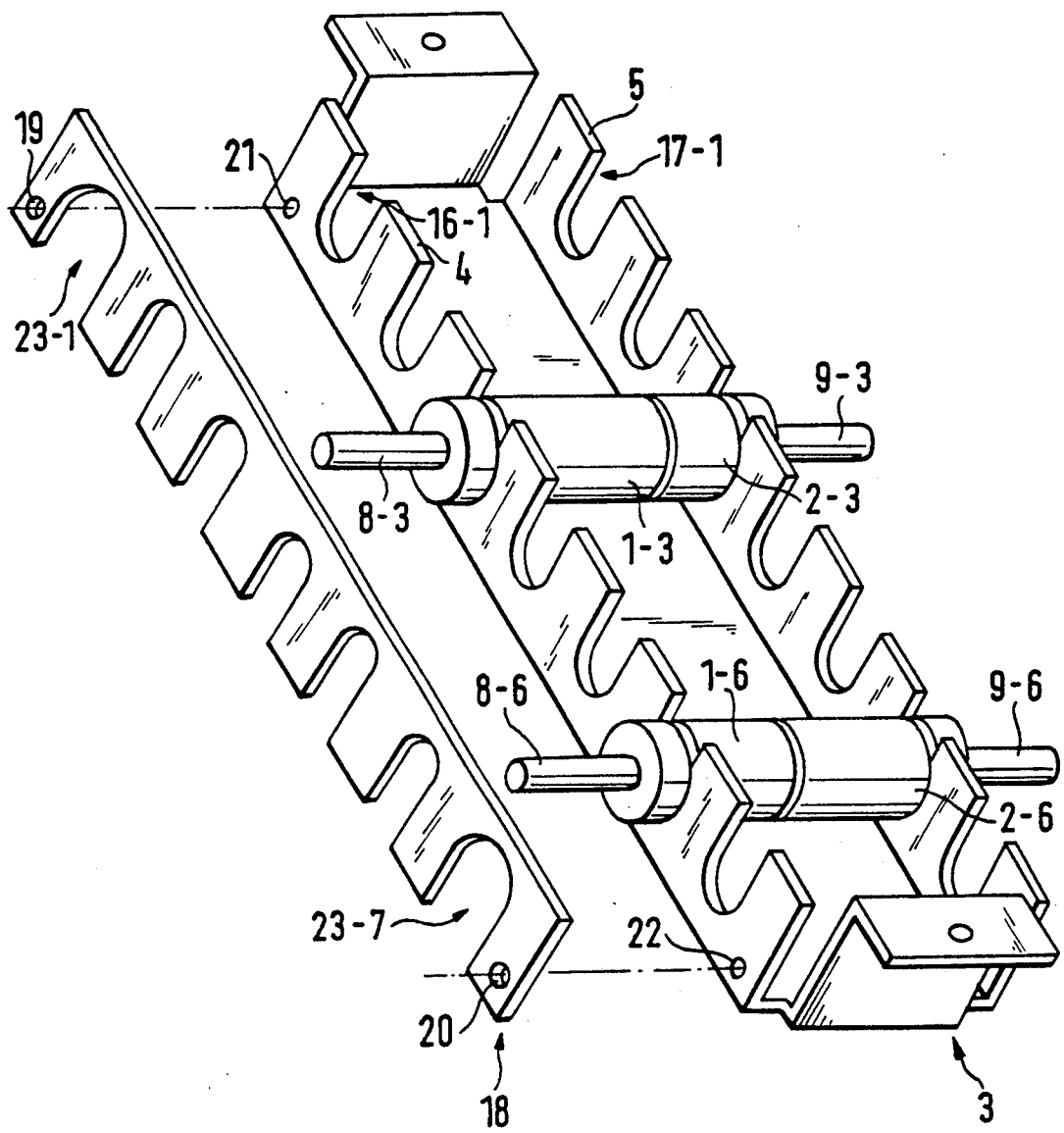
FIG. 2 is a perspective view of the same embodiment with two pairs of inserted coupling members.
Figure 3:
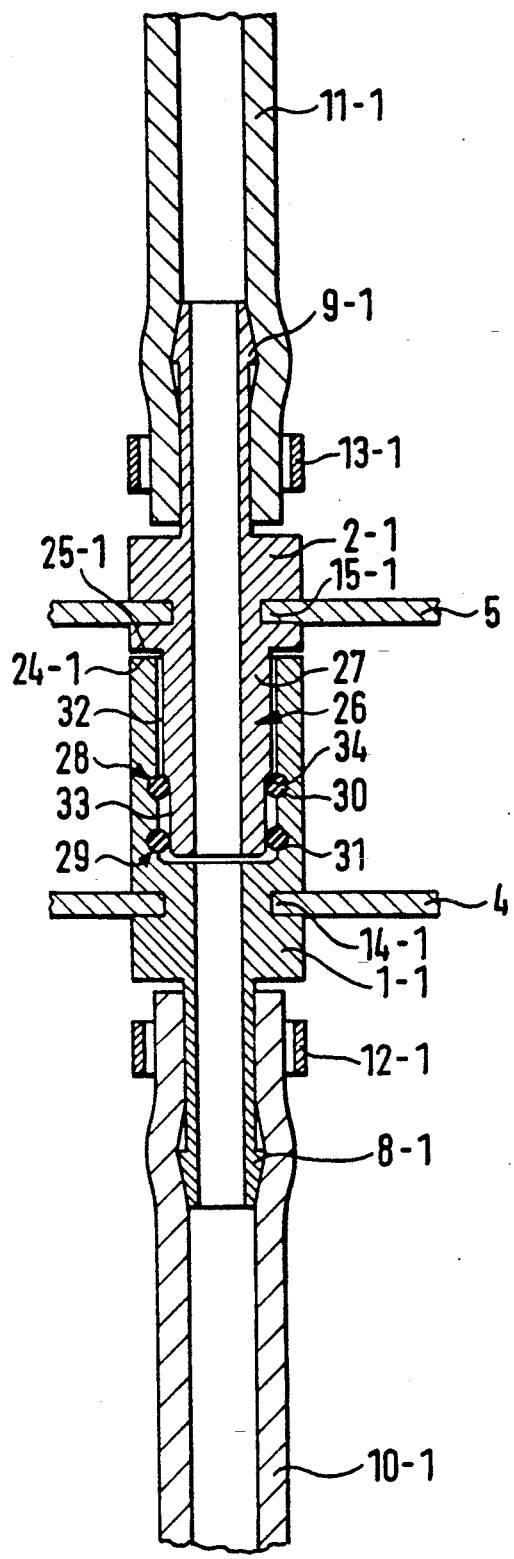
FIG. 3 is a sectional representation of a connected pair of coupling members with hoses connected thereto.

As shown in FIGS. 1 to 3, the coupling system according to the preferred embodiment comprises a plurality of rotationally symmetric couplings or female connectors 1-1 to 1-7 and plug nipples or male plugs 2-1 to 2-7 as well as a holder 3 having a first holding member 4 and a second holding member 5. The holder 3 receives the connected pairs of female connectors and male plugs and comprises bores 6 and 7 for mounting, for example, to an installation system.

The connectors 1-1 to 1-7 and the plugs 2-1 to 2-7 each have hose nozzles 8-1 to 8-7 and 9-1 to 9-7 for mounting a respective hose 10 and 11 carrying a medium (oxygen, narcotic gas, nitrogen, vacuum, etc.) by means of hose clamps 12 and 13.

The connectors and plugs further have annular grooves 14-1 to 14-7 and 15-1 to 15-7, respectively, of differing depths for engagement with a corresponding edge of notches or cutouts 16-1 to 16-7 and 17-1 to 17-7, respectively, of the first holding member 4 or the second holding member 5, respectively, of the holder 3, if the connector-plug-pair is inserted into the holder 3 from above as shown in FIG. 2.

As shown in FIG. 2, a locking bar or sheet 18 having bores 19 and 20 can be slipped onto the holding member 4 and connected thereto through bores 21 and 22 provided in the holder 3. The locking bar comprises notches 23-1 to 23-7 surrounding a portion of the outer circumferential surface of the couplings 1-1 to 1-7 and of the plugs 2-1 to 2-7, respectively, when screwed on.

The couplings 1-1 to 1-7 each have a different length a1 to a7 between their respective annular groove 14-1 to 14-7 and their front face 24-1 to 24-7 facing the plug when connected thereto. The individual lengths continuously and successively lessen from a1 to a7. Similarly but inversely, the lengths b1 to b7 between the annular grooves 15-1 to 15-7 and the front faces 25-1 to 25-7 of the plugs 2-1 to 2-7 facing the coupling differ such that the sum of the lengths (a1+b1), (a2+b2), . . . (a7+b7) of matching or corresponding couplings 1-1, 1-2, . . . , 1-7 and plugs 2-1, 2-2, . . . , 2-7 has the identical value c, whereas the sum of the lengths of unmatching couplings and plugs has a smaller or larger value than c. The length c equals the distance between both holding member 4 and 5 of the holder 3.

The couplings 1-1 to 1-7 each have a cylindrical recess or bore 26 for receiving the front part 27 of the plugs 2-1 to 2-7. Two annular grooves 28 and 29 each receiving a respective seal (O-ring seal) 30 and 31 are formed spaced from each other within the recess or hole 26.

The plugs 2-1 to 2-7 each have a front part 27 in the form of stepped cylinder. The transition between the two steps 32 and 33 of the cylinder is formed by a bezel 34 having an inclination angle of 45°. The relation of the diameter of the forward cylinder 27 to the inner diameter of the O-ring seals 30 and 31 and the relation of the backward cylinder 32 to the inner diameter of the bore 26 of the coupling are selected such that a tight fit of the front part 27 of the plug having the O-ring seals is only obtained if the plug is completely inserted into the coupling (when the facing front faces 24 and 25 contact each other with an eventual small clearance caused by manufacturing tolerances and the elastic abutment of the bezel and the O-ring seal 30).

When using the coupling system for connection of hoses 11-1 to 11-7 (only 11-1 is shown) with hoses 10-1 to 10-7 (only 10-1 is shown) a respective coupling 1-1 to 1-7 is mounted to each of the hoses 10-1 to 10-7 by means of the hose clamps 12-1 to 12-7 (only 12-1 is shown) and a respective plug 2-1 to 2-7 is mounted to each of the hoses 11-1 to 11-7 by means of hose clamps 13-1 5o 13-7 (only 13-1 is shown). Matching couplings and plugs, i.e. those having a sum of lengths a and b which equals the value c which corresponds to the distance of the holding members 4 and 5 of the holder 3, are mounted to hoses carrying the same medium or fluid.

The holder 3 is screwed to a carrier of an installation system or to the wall at the bores 6 and 7 thereof. For connection of the hoses 10-1 to 10-7 with the hoses 11-1 to 11-7 the plugs 2-1 to 2-7 mounted to the hoses 11-1 to 11-7 are simply inserted into the couplings 1-1 to 1-7 mounted to the hoses 10-1 to 10-7 until their facing front faces 24-1 to 24-7 (only 24-1 is shown) and 25-1 to 25-7 (only 25-1 is shown) make contact, and when accordingly assembled put from above into a respective pair of notches 16-1, 17-1 to 16-7, 17-7 of the holding members 4 and 5 of the holder. This insertion into the holder is eased by the possibility of slightly compressing the parts owing to the elastic contact between the bezel 34 at the front part of the plug 2-1 and the O-ring seal 30 within the coupling 1-1. Assuming that erroneously a coupling and an unmatching plug were combined, i.e. coupling members for different media—e.g. the coupling 1-1 mounted to the hose 10-1 and the plug 2-2 mounted to the hose 11-2—, then it turns out when attempting to push the coupling members into the holder 3 that the distance of the respective annular grooves, e.g. the distance of the grooves 14-1 and 15-2, i.e. the sum of the distances a1 and b2, does not correspond to the distance c of the holding members 4 and 5. If the distance between the annular grooves is greater than the distance of the holding members then it is impossible to put the coupling-plug-pair into the holder. If this distance is smaller the pair could be put into the holder only after extension of the connection. Apart from the fact that such a deliberate extension of the connection can be excluded when used by a skilled man, the seal between the plug and the coupling would be broken such that the medium would escape at the point of connection and an additional error signal would be provided thereby.

After all correctly assembled pairs of couplings and plugs 2-1, 1-1 to 2-7, 1-7 have been put into the holder the locking bar 18 is pushed on and screwed to the holder, whereby the pairs of couplings and plugs are secured against the dropping-off from the holder or unintentional removal thereof and thus against loosening of the connection.

The couplings and plugs used are pure turned parts and their manufacture is, therefore, simple and cheap.

By adapting the graduated lengths of the couplings and plugs to the respective purpose the system can be variably adapted to the various complex applications.

The system is applicable to gaseous or liquid media; a modification to provide plugs and and sockets of graduated lengths for connection to electric lines is, however, also suitable for a connection of electric lines or signal lines.

The holder can be adapted to receive a plurality of pairs of coupling members, as shown in the embodiment; alternatively, respective separate holders can be provided for each such pair.

Eventually, the annular grooves 14-1 to 14-7, 15-1 to 15-7 for engagement with the holder 3 may be omitted and replaced by the engagement of the front faces of the couplings and plugs facing the hose nozzle.

According to a further modification, the coupling members are formed with screw connection. In this case, a holder for holding the connection together is not required but only a standard for the total length of the "correct" connection is necessary.

Although the invention has been described with reference to a specific example embodiment, it is to be understood that it is intended to cover all modifications and equivalents within the scope of the appended claims.

What is claimed is:

1. A line coupling system comprising
a plurality of first coupling members for connection with respective first lines,
and a plurality of second coupling members for connection with respective second lines,
said first coupling members and said second coupling members having a match code in the form of a length which differs from the lengths of the other first and second coupling members respectively, and which is selected such that the sum of the lengths of matching or corresponding first and second coupling members when connected to each other has a predetermined constant value.

2. The line coupling system of claim 1, comprising a holding means for holding two joined coupling members, said holding means comprising two spaced holding members, the distance between said holding members being equal to the length of the joined matching coupling members.

3. The line coupling system of claim 2, comprising elastic means for providing a predetermined elasticity between the joined coupling members in longitudinal direction such that said coupling members can be slightly compressed in the joined state for insertion into said holder.

4. The line coupling system of claim 1, wherein said coupling members each have engagement portions for engagement with a respective one of said holding members and wherein the distance of said engagement portions of joined coupling members constitutes the length representing said match code.

5. The line coupling system of claim 4, wherein each of said coupling members has a front face, and a stop, and wherein said distance of said engagement portions of the two joined coupling members is the sum of the distance between the engagement portion of the first coupling member and the front face of the first coupling member forming a stop for the second coupling member and the distance between the engagement portion of the second coupling member and a front face of the second coupling member abutting the stop of the first coupling member.

6. The line coupling system of claim 4, wherein said engagement portions of said coupling members are formed as annular grooves.

7. The line coupling system of claim 3, wherein said engagement portions of said coupling members are formed of the front faces of said coupling members which face the corresponding line connection.

8. The line coupling system of claim 4, wherein said holding members of said holder are formed as metal sheets having a notch embracing a part of the circumference of said engagement portions of said first or second coupling members, respectively.

9. The line coupling system of claim 1, wherein the lines which are connected by said coupling members carry material media.

10. The line coupling system of claim 9, comprising an O-ring seal for sealing said coupling members, said O-ring seal being inserted into an inner peripheral groove of said second coupling member and cooperating with the outer peripheral surface of a front portion of said first coupling member which is inserted into said second coupling member.

11. The line coupling system of claim 10, comprising two O-ring seals received in two inner peripheral grooves of said second coupling member, said two grooves being spaced in longitudinal direction of said second coupling member.

12. The line coupling system of claim 9, wherein at least one of said lines is formed as a hose which is attached to the respective coupling member by means of a hose clamp.

13. The line coupling system of claim 10, wherein said front portion of said first coupling member which is inserted into said second coupling member has a first cylindrical portion adjacent the free end of said front portion, a second cylindrical portion having a larger diameter than said first cylindrical portion and being disposed at the side of the first cylindrical portion opposite to said free end, and a bezel having an inclination angle of 45° between said first and second cylindrical portions, said bezel cooperating with said O-ring seal to form a tight contact when the first coupling member is fully inserted into said second coupling member and forming a leaky contact when said first coupling member is not fully inserted into said second coupling member.

14. The line coupling system of claim 1, wherein the lines which are connected by said coupling members are electrical current lines or signal lines.

* * * * *